Dec. 1, 1953  R. H. WATSON  2,660,903
STAY IN GEAR
Filed April 10, 1951

Inventor
Raymond H. Watson,
By David H. Eckroad,
Attorney

Patented Dec. 1, 1953

2,660,903

UNITED STATES PATENT OFFICE 2,660,903

STAY IN GEAR

Raymond H. Watson, Greenfield, Ohio

Application April 10, 1951, Serial No. 220,308

2 Claims. (Cl. 74—484)

The present invention relates to a device for holding standard gear shift lever in high gear position and it consists in the combinations, constructions and arrangements of parts herein described and claimed.

Generally there is provided a device which may be attached to the conventional standard gear shift lever and to the steering column of an automobile and the use of which provides a means whereby, when the conventional gear shift lever is moved to high gear position, the same will be frictionally maintained in such position against ordinary vibration which often causes the accidental displacement of such lever from such position.

It is accordingly an object of the invention to provide a device of the character set forth which is simple in construction, easy to install, inexpensive to manufacture and yet effective and efficient in use.

Another object of the invention is the provision of novel means for maintaining a standard gear shift lever in its high gear position.

Other and further objects of the invention will become apparent from a reading of the following specification taken in conjunction with the drawing, in which.

Figure 1:
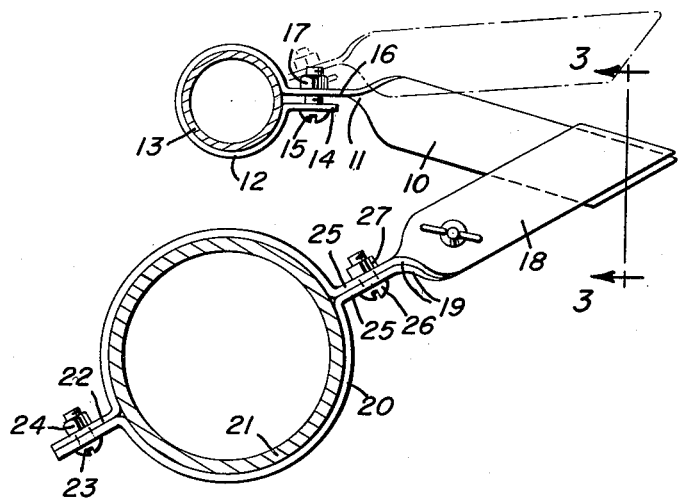
Figure 1 is a sectional view taken substantially along line 1—1 of Figure 2.

To better show the invention, the blades are shown apart from each other.

Referring more particularly to the drawing, there is shown therein a device for maintaining the conventional gear shift lever of a standard gear shift in its high gear position and it consists of a flat horizontally extending blade 10 which is twisted, as indicated at 11, and whose other end is formed as a circular clamp member 12 which is adapted to encircle a conventional gear shift lever 13 and which terminates in an ear 14 which is apertured to receive a bolt 15 which likewise extends through a portion 16 which interconnects the clamp 13 and the twisted portion 11. The bolt is provided with a nut 17.

Another portion of the invention is the provision of a pair of parallel spaced blades 18 both of which are twisted, as indicated at 19 and are integrally interconnected with a clamp member 20 which encircles a steering column 21 and both of which terminate in ears 22 which are apertured to receive therethrough a bolt 23 which is provided with a nut 24. Each of the blades 18 is provided with an integrally formed connecting portion 25 which integrally connects the same with the clamp 20 and the portions 25 are apertured to receive a bolt 26 which is also provided with a nut 27. Extending through the blades 18 adjacent the inner ends thereof is a bolt 28 which is provided with a wing nut 29 and a compression spring 30 surrounds the bolt 28 between the blades 18.

Figure 2:
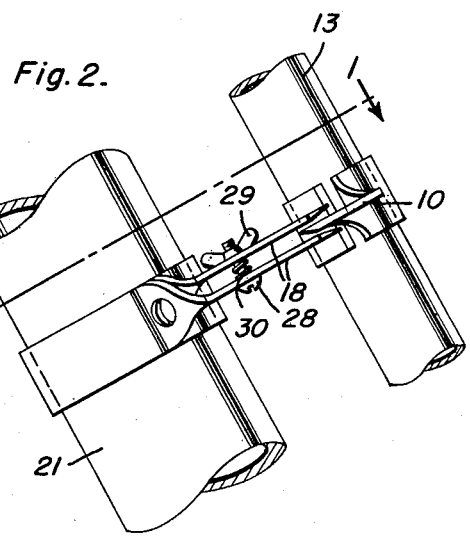
Figure 2 is a side elevational view of the device shown in Figure 1.
Figure 3:
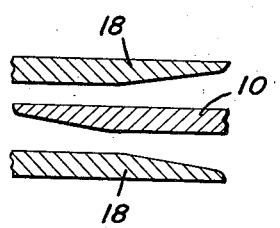
Figure 3 is an enlarged sectional view taken substantially along line 3—3 of Figure 1.

In operation, it will be apparent that both of the devices which are attachable to the lever 13 and column 21 may be mounted at the lower end of such column and lever and, if desired, may be covered by the conventional floor mat. The devices are so mounted upon their respective mounts that when the gear shift lever 13 is moved to its high gear position, the blade 10 will be received frictionally between the pair of blades 18 as viewed in Figure 2. To adjust the tension of the blades 18 upon the blade 10, the wing nut 29 may be manipulated against the action of the compression spring 30 to properly position the blades 18. When the blade 10 is received frictionally between the blades 18, it will act to hold the lever 13 in the high gear position referred to.

While but one form of the invention has been shown and described herein, it will be readily apparent to those skilled in the art that many minor modifications may be made without departing from the spirit of the invention or the scope of the appended claims.

What is claimed is:

1. A device of the type described comprising in combination with a steering wheel column and a standard gear shift rod, a single elongated flat blade having its one end affixed to said rod and extending horizontally outwardly therefrom, a pair of elongated slightly spaced apart blades in parallel relation with each other, said blades having their one end disposed around and affixed on said column and extending horizontally therefrom, and the outer end of the said first blade adapted to be frictionally received between the outer ends of the said pair of blades when said gear shift lever is in the high gear position.

2. A device as described in claim 1, a clamping means for holding the said first blade securely affixed to said gear shift rod, a further clamping means for holding said pair of blades securely affixed to said column, said pair of blades provided with a wing set screw as a means for adjusting the space between them for frictionally receiving the outer end of said first blade therebetween, and the frictional engagement of the said first blade between the said pair of blades providing a means for holding said shift lever in the said high gear position.

RAYMOND H. WATSON.

References Cited in the file of this patent

UNITED STATES PATENTS

| Number | Name | Date |
|---|---|---|
| 787,565 | Coryell et al. | Apr. 18, 1905 |
| 1,123,915 | Neel | Jan. 5, 1915 |
| 1,476,616 | Jacobus | Dec. 4, 1923 |
| 1,560,252 | Eshelman et al. | Nov. 3, 1925 |
| 2,024,016 | Wear | Dec. 10, 1935 |
| 2,170,736 | Stegmeier | Aug. 22, 1939 |
| 2,411,455 | Mullins et al. | Nov. 19, 1946 |
| 2,433,794 | Sprigman | Dec. 30, 1947 |